(12) United States Patent
Dharmaraju et al.

(10) Patent No.: US 8,457,553 B2
(45) Date of Patent: Jun. 4, 2013

(54) REMOVAL OF AMBIGUITIES IN FORMING NEW PICONET CONTROLLER (PNC) WHEN THE CURRENT PNC CONTROLLER IS SUDDENLY UNAVAILABLE

(75) Inventors: Dinesh Dharmaraju, San Diego, CA (US); Saishankar Nandagopalan, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 587 days.

(21) Appl. No.: 11/690,103

(22) Filed: Mar. 22, 2007

(65) Prior Publication Data

US 2008/0232393 A1 Sep. 25, 2008

(51) Int. Cl.
*H04B 7/00* (2006.01)
(52) U.S. Cl.
USPC .......................... 455/41.2; 455/507; 370/328
(58) Field of Classification Search
USPC .......................... 370/346, 328; 455/41.2, 507
See application file for complete search history.

(56) References Cited

U.S. PATENT DOCUMENTS

| | | | | |
|---|---|---|---|---|
| 6,091,741 | A * | 7/2000 | Fujiwara et al. | 370/465 |
| 6,813,260 | B1 * | 11/2004 | Fogle | 370/338 |
| 6,885,656 | B2 * | 4/2005 | Sashihara | 370/350 |
| 7,016,336 | B2 | 3/2006 | Sorensen | |
| 7,036,051 | B1 | 4/2006 | Fernandes | |
| 7,164,887 | B2 | 1/2007 | Tanada et al. | |
| 7,359,950 | B2 * | 4/2008 | Choi et al. | 709/209 |
| 7,447,178 | B2 | 11/2008 | Kim et al. | |
| 7,447,503 | B2 * | 11/2008 | Shvodian | 455/435.2 |
| 2002/0082035 | A1 | 6/2002 | Aihara et al. | |
| 2002/0168943 | A1 * | 11/2002 | Callaway et al. | 455/67.1 |

FOREIGN PATENT DOCUMENTS

| | | |
|---|---|---|
| CN | 1335698 A | 2/2002 |
| EP | 1176762 | 1/2002 |
| JP | 2002044003 A | 2/2002 |
| JP | 2002111689 A | 4/2002 |
| JP | 2004312060 A | 11/2004 |

OTHER PUBLICATIONS

Heonju Jeong et al: "PNC Candidate inquiry method for PNC Handover and WPAN" Personal, Indoor and Mobile Radio Communications, 2004. PIMRC 2004. 15th IEEE International Symposium on Barcelona Spain Sep. 5-8, 2004, Piscataway, NJ, USA, IEEE, vol. 3, pp. 1752-1756, XP010754241.

(Continued)

*Primary Examiner* — Lester Kincaid
*Assistant Examiner* — Steven Kelley
(74) *Attorney, Agent, or Firm* — Jeffrey D. Jacobs; Mary A. Fales

(57) ABSTRACT

A piconet in which at least one master communication station and at least one slave communication station are self-designated implements a successor hierarchy. A wireless device (DEV) functioning as a piconet controller (PNC) poll a plurality of DEVs to obtain data concerning other DEVs in range of the respective polled DEVs. Data concerning stations in range of the respective polled stations is received and at least one successor DEV is selected as a successor PNC based on the received data concerning stations in range of the respective polled DEVs. The selection of the successor DEVs is communicated to the successor DEVs. This provides for continuity of communication.

10 Claims, 6 Drawing Sheets

OTHER PUBLICATIONS

Byung-Jae Kwak et al: "Proactive Coordinator Appropriation (PCA) Scheme for Wireless Personal Area Networks" Vehicular Technology Conference, 2006. VTC-2006 Fall. 2006 IEEE 64th, IEEE, PI, Sep. 1, 2006. pp. 1-5. XP031051491.

Won Soo Kim et al: "A Seamless Coordinator Switching (SCS) Scheme for Wireless Personal Area Network" IEEE Transactions on Consumer Electronics, IEEE Service Center, New York, NY, US, vol. 49, No. 3, Aug. 1, 2003, pp. 554-560, XP001172097.

International Search Report—PCT/US2008/057937, International Search Authority—European Patent Office—Jul. 16, 2008.

Written Opinion—PCT/US2008/057937, International Search Authority—European Patent Office—Jul. 16, 2008.

Taiwan Search Report—TW097110169—TIPO—Jun. 28, 2011.

* cited by examiner

REMOVAL OF AMBIGUITIES IN FORMING NEW PICONET CONTROLLER (PNC) WHEN THE CURRENT PNC CONTROLLER IS SUDDENLY UNAVAILABLE

BACKGROUND

I. Field

This generally relates to communications. More particularly, the invention relates to communications of short-range networks serving-specific purposes.

II. Background

In some WLAN systems, including wireless personal area-networks (WPANs) such as those established under IEEE 802.15 protocols for personal area networks (PANs), a host function is assumed by self-selection.

A WPAN is sometimes called a piconet. As used herein, the terms "WPAN" and "piconet" are used interchangeably. In a typical piconet, one or more devices (DEVs) are linked together. In an arrangement where more than one DEV is present in the piconet, one of the devices is identified as the piconet controller (PNC) which assumes the function of coordinating other DEVs within the piconet. The criteria to be designated as the PNC are set forth in IEEE 805.15.3. It should be noted that the description of IEEE 802.15 protocols is for clarity of explanation and is not intended to be limiting as to the scope of the invention.

One example of an IEEE 802.15 architecture is given by the IEEE 802.15.3a wireless USB specification. The IEEE 802.15.3a standard wireless USB (WUSB) specification does not support the use of hubs. Instead, WUSB also supports dual-role devices, which in addition to being a WUSB client device, can function as a host with limited capabilities. The host role is taken by a WUSB device that is capable of performing the host functions and does not see another host within a local network. The WUSB device assuming the host function establishes a PAN.

Equipment components can be interconnected wirelessly. For example, in a computer system, various peripheral devices can be linked together via a wireless personal network (WPAN). A WPAN is very often designed to be short-ranged in nature serving one or more special purposes. Standards for WPANs are published, for example, in the IEEE 802.15.3, entitled "Wireless Medium Access Control (MAC) and the Physical Layer (PHY) Specifications for High Rate Wireless Personal Area Networks (WPAN)".

While there are some circumstances in which the PAN would not have any function without the particular device which assumed the host role, there are other instance in which it is desired to maintain network connections regardless of whether the original host remains on-line as part of the network. According to the IEEE 802.15.3a specification, if a host device, known as a piconet controller (PNC) drops out, the PAN (network) collapses and another device capable of function as a host may establish a new PAN. This results in a network interruption until the new PAN is established, and also results in wireless connections terminating and then becoming reestablished.

There is a handoff process stated in IEEE 805.15.3. That is, the designated PNC has the option of handing over control of the piconet to another DEV. For example, when there is another device more capable of being the PNC, or the currently designated PNC intends to leave the piconet, the handover procedure can be carried out.

Heretofore, no provision has been made in a scenario when the current PNC suddenly stops communicating with other DEVs, for example, in a power failure, a hardware malfunction, a sudden turnoff of the power switch, or the current PNC suddenly moving away from the piconet without warning. When that occurs, timing synchronization among DEVs would be disrupted. The piconet can be restarted, and can then attempt to designate another DEV as the PNC; however, restarting and resetting the piconet are relatively time-consuming. Additionally, critical data could be lost which may not be recoverable during the piconet interruption process. The same unwanted consequences can also occur even if a handoff candidate has been designated by the current PNC. For instance, when both the current PNC and the designated PNC candidate suddenly move away, communications among DEVs of the piconet would also be jeopardized.

SUMMARY

Continuity of communications is provided in a communication system in a network. The network includes at least one master communication station and at least one slave communication station having a capability of functioning as a master communication station. A plurality of stations are polled to obtain data concerning stations in range of the respective polled stations. Data concerning the polled stations is received and at least one successor station is selected based on the received data. The selection of the successor station is then communicated to the successor station.

Various aspects and embodiments of the invention are described in further detail below.

BRIEF DESCRIPTION OF THE DRAWINGS

The features and nature of the present invention will become more apparent from the detailed description set forth below when taken in conjunction with the drawings in which like reference characters identify correspondingly throughout and wherein.

DETAILED DESCRIPTION

Overview

Figure 1:
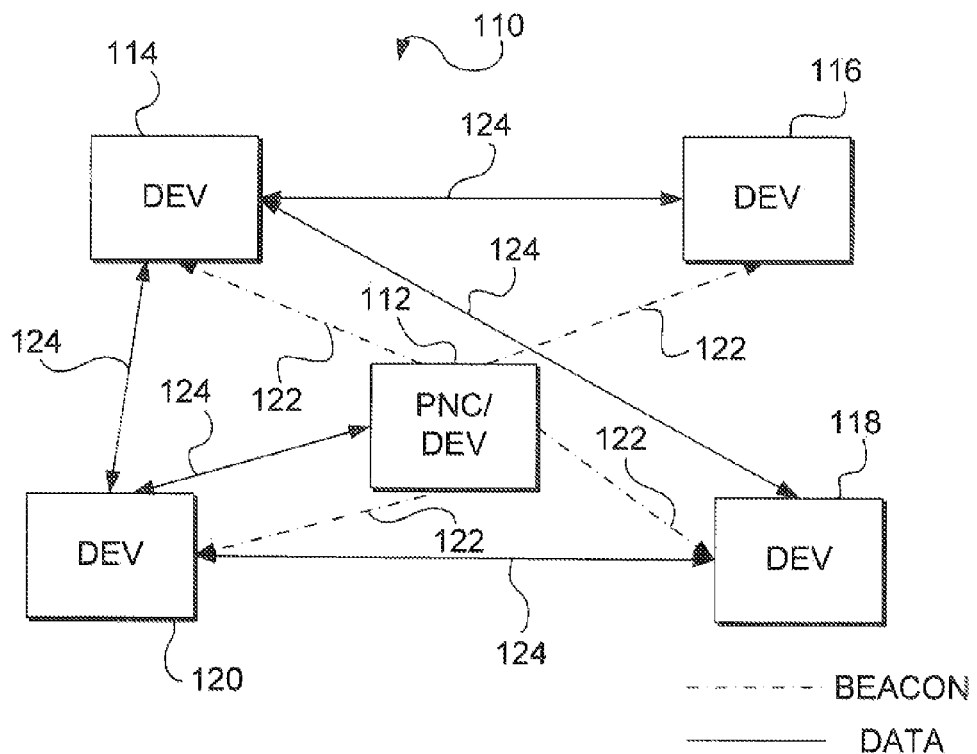
FIG. 1 is a schematic drawing depicting a local wireless network environment for a wireless personal area network (WPAN).

A piconet is a collection of one or more devices that share a single identifier with a common coordinator, known as a PNC. The PNC is responsible for issuing a beacon and maintaining the timing of the network devices. This beacon is provided by the PNC within the superframe.

One of the significant problems in implementing the IEEE 802.15.3 MAC is that when the PNC fails, it takes more time to restart the network because the associated devices do not know that the PNC controller has switched off; instead, the devices react to a beacon lost, in the sense of a fading channel condition. This loss leads to loss of timing synchronization between different devices and results in deterioration of quality of service (QoS) of the existing streams. After the beacons are not received for some time, the current standard specifies that the devices shall initiate a PNC handover. IEEE 802.15.3 provides a mechanism for the PNC to perform handover of the PNC functionality. The PNC is supposed to perform handover when a more capable device joins the piconet, or when the PNC knows it is terminating its PNC functions. Unfortunately, it is not always possible for the PNC to know it is terminating its functions. When this happens, the other devices in the piconet are left unable to communicate because there is no more PNC. In theory, one of the remaining devices could assume the role of PNC when that device determines that the PNC is no longer active or in range, but there are drawbacks to this. First, there is no standard way of saving the piconet, and therefore a new piconet must be formed. Second, multiple devices in the piconet could simultaneously assume the role of PNC in new piconets. Third, since a new piconet is being formed, every device would have to join the new piconet and re-establish ail communications.

The PNC always attempts to select another DEV in the piconet to become PNC if the PNC goes away without handing over. If there is no other PNC capable device in the piconet, that is indicated. If there is one other PNC capable device in the piconet, that device is identified as the next PNC. If there are multiple PNC capable devices, the PNG chooses the best qualified device to be the next PNC and periodically advertises the next PNC via an IE in the beacon. In addition to the information in the PNC rating field, the PNC should also consider the information concerning which devices can hear which other devices in the piconet. In order to allow the PNC to determine which devices can hear other devices in the piconet, each DEV should listen to all MCTAs or the CAP to make note of which other devices in the piconet the listening DEV can hear and how well. A new command is introduced to provide this information to the PNC. Since each DEV transmits a management frame to the PNC at least once per association timeout period (ATP), if the DEV has nothing else to send to the PNC, the DEV should send the new command with the information about all of the devices in the piconet.

In the current IEEE 802.15.3 standard, the PNC only selects one device from among the eligible devices to form the successor PNC in the event the initial PNC is switched off abruptly. If the successor device is also unavailable, then the network fails. To alleviate this problem and failure mode, a simple algorithm is used by the current PNC to rank the order of PNC successors in case of failure or termination of the initial PNC. The issue of loss of a successor device is addressed by providing a tangible output of the system determination procedure and/or results.

Specific details are given to provide a thorough understanding of the embodiments; however, it will be understood by one of ordinary skill in the art that the embodiments may be practiced without these specific detail. For example, circuits may be shown in block diagrams in order not to obscure the embodiments in unnecessary detail. In other instances, well-known circuits, structures and techniques may be shown in detail in order not to obscure the embodiments. The embodiments may be described as a process which is depicted as a flowchart, a flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed. A process may correspond to a method, a function, a procedure, a subroutine, a subprogram, etc. When a process corresponds to a function, its termination corresponds to a return of the function to the calling function or the main function.

As disclosed herein, a storage medium or module may represent one or more devices for storing data, including read only memory (ROM), random access memory (RAM), magnetic disk storage mediums, optical storage mediums, flash memory devices and/or other storage medium for storing information. The term storage medium includes, but is not limited to portable or fixed storage devices, optical storage devices, wireless channels and various other mediums capable of storing, containing or carrying instruction(s) and/or data, typically as mass memory used for computing. This can he read/write memory such as a computer's hard drive or other mass storage and constitutes a memory store. In some cases, the memory store can be in the form of permanent memory such as memory stored on read-only optical discs.

The memory may also be external to the device, and so may be provided through wireless channels and various other mediums capable of storing, containing or carrying instructions and/or data.

The system functions in a wireless network which includes at least one master communication station and one or more slave communication stations. At least one slave communication station having a capability of functioning as a master communication station. Ambiguities are removed in farming a new piconet controller (PNC) when the current PNC controller is turned off or moved out of range. This provides an elegant and efficient way to recover the network when the PNC is switched off by the user or goes out of range because of mobility. The configuration provides a simple polling and neighborhood dissemination (NHD) scheme, wherein the PNC ranks the order of other devices to be selected as PNC if the current PNC is removed from the network. This may include a modification in the frame formats of the protocol, such as an IEEE 802.15.3 MAC beacon frame, by reserving a period called the NHD time. This beacon frame is in the superframe used by the PNC to determine an order of successors.

Operational Environment

FIG. 1 is a schematic drawing depicting a local wireless network environment for a wireless personal area network (WPAN) or piconet, in which the piconet is signified by the reference numeral 110. A device, designated DEV 112, is designated as the PNC in this example. The PNC/DEV 112 coordinates communications among DEVs 114, 116, 118 and 120. The coordination can be made possible via the beacon signals 122. Data communications among DEVs can be carried out wirelessly via data paths 124.

The signal and data paths 122 and 124 are shown as separate paths for the sake of explanation. However, in operation, the beacons 122 and the data 124 are exchanged among the PNC/DEV 112 and DEVs 114, 116, 118 and 120 via superframes.

Figure 2:
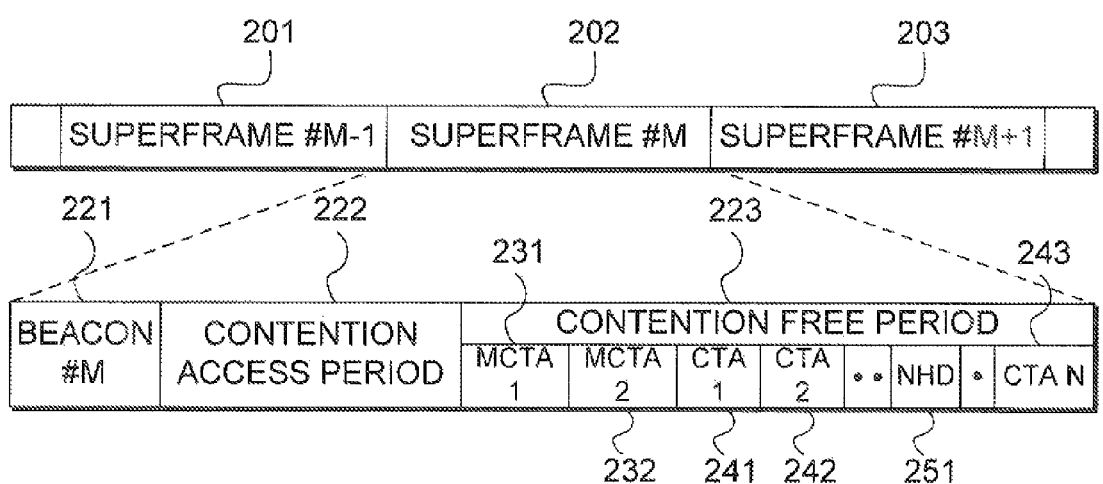
FIG. 2 is a diagrammatical representation of superframes exchanges in the WPAN of FIG. 1.

FIG. 2 is a depiction of the structure of dataframes showing successive superframes 201, 202, 203. Taking superframe 202 (designated as superframe #m) for illustration, the superframe includes a beacon 221, a contention access period 222, and a contention-free period 223. Contention-free period (CFP) 223 includes management channel time allocations (MCTAs) 231, 232, channel time allocations (CTAs) 241, 242, 243. Also depicted is a time allocation designated as a neighborhood dissemination (NHD) subframe 251, as will be described later.

Beacon 221 is sent out only by PNC 112 (FIG. 1). In this case, it is the beacon #m which conveys timing allocations and management information, among the DEVs.

Contention access period (CAP) 223 is positioned adjacent to the beacon 221. The CAP 223 is optional and is used by DEVs to communicate commands and/or asynchronous data. For instance, when a particular DEV requests a certain period of time for data transfer to another DEV, the requesting DEV makes the request in the CAP 223. The length of the CAP 223 is determined by PNC 112 and communicated to the DEVs in the piconet via the beacon 221.

The contention tree period (CFP) 223 which comprises CTAs 241-243 and MCTAs 231, 232. CTAs 241-243 are used for exchanging among DEVs, including the PNC, commands, isochronous streams and asynchronous data. The MCTAs are used for conveying management information for CTAs 241-243. The MCTAs are primarily exchanged between PNC 112 and the other DEVs 114, 116, 118, 120 (FIG. 1). Furthermore, MCTAs 231, 232 can be positioned anywhere within the CFP amongst the CTAs 241-243.

Reference is now directed back to FIG. 1. As mentioned earlier, for example, when PNC 112 suddenly stops communicating for reasons as also previously mentioned, the piconet 110 would enter into a state of chaos, meaning the piconet 110 fails. Until the piconet 110 is restarted and reset, time lost is unavoidable, and more significantly, communication is interrupted. Furthermore, critical data in the midst of transmission could be permanently lost. To avoid such unwanted consequences, in accordance with an exemplary embodiment of the invention, multiple PNC successors are designated in a hierarchical order. The designation criteria can be based on a variety of factors, such as signal strength reachable by other DEVs, physical location, security requirements, and so forth.

As an illustrative example, still referring back to FIG. 1, suppose DEV 112 initially enters the piconet 110 with no other DEVs in existence. In that case, DEV 112 is the current PNC. Then, the PNC/DEV 112 waits for other devices to associate with the piconet 110. If there is a second DEV (e.g., DEV 114) that associated with the piconet 110, then the current PNC 112 announces in the beacon that this second DEV 114 shall be the successor PNC in case the current PNC 112 fails. If there is a third DEV (e.g., DEV 116) that associates with the piconet 110, then the current PNC/DEV 112 names the third DEV 116 as the 2nd successor PNC. As such, the third DEV 116 shall become the PNC if the current PNC 112 and 1st successor PNC (DEV 114) both fail.

Alternatively, the hierarchical order of PNC successors can be periodically rearranged, e.g., based on capabilities. For instance, in the above example, if the 3rd DEV 116 is more capable of being a PNC, the 3rd DEV 116 can be promoted to be the 1st successor after the current PNC/DEV 112. As yet another alternative, the 3rd DEV 116 can replace the current PNC/DEV 112 and takes over the role as the current PNC, if it is more favorable to do so. Briefly put, if the current PNC 112 determines that any one of DEVs 114, 116, 118, 120 is more capable of being the PNC, the current PNC may initiate handover as explained in IEEE 802.15.3.

On the other hand, if a DEV indicates that it merely intends to associate with the current piconet 110, then the current PNC 112 should place that DEV in a lower hierarchical order for PNC succession. In the case of a DEV not having a capability of becoming a PNC, the succession would preclude such a handoff.

Alternatively, DEV 112 can assign a hierarchy to a DEV which has no capability of assuming the PNC succession. If the DEV fails to assume the succession, then the next successor device in the hierarchy of succession would assume the PNC function. The hierarchal order is established by the number of missed beacons detected by the DEV before that DEV assumes the PNC function as a successor PNC. Thus, if a particular DEV is assigned a hierarchy which dictates that the DEV assumes a PNC function after a DEV with a higher hierarchy, the number of missed beacons cause the DEV to wait at least one more missed beacon than the DEV with the higher hierarchy before assuming the PNC function. This establishes a functional hierarchal order for the successor DEVs.

As mentioned before, the physical location of a DEV is an important factor to consider in PNC succession planning. To accomplish this end, the current PNC 112 reserves the neighborhood dissemination time NHD 251 in the CFP 223 period of the superframe as shown in FIG. 2. In this configuration, the NHD 251 replaces one or more of the CTAs. During the NHD time 251, the current PNC 112 polls all DEVs for information, such as their knowledge of their current neighbors and their received signal strength indicators (RSSIs). Once the polled DEVs respond, the received information is put in a global database, e.g., stored in the current PNC's memory. Furthermore, each DEV also periodically keeps record of its neighborhood information, and stores the information in the DEV's memory, as will be described further below.

Alternatively, the NHD 251 can be placed in the CAP period 223 of the superframe 222. As with the NHD 251 replacing one of the CTAs, the during the NHD time, the current PNC 112 polls all DEVs for information, such as their knowledge of their current neighbors and their received signal strength indicators (RSSIs).

The polling process should be conducted in a round-robin fashion, preferably several times. In this example, the polling process is carried out twice. Thereafter, the current PNC 112 determines and announces the hierarchical list of PNC successors. As such, for instance, after a predetermined number of superframes when any one of the DEVs has not received a beacon 122. The 1st successor in the PNC successor list shall become the PNC, under the assumption that the previous PNC is no longer reachable. The new PNC then takes over and performs similar duties as the previous PNC, for example, inter alia, continues with polling other DEVs during the NHD time.

All beacons to be sent out by the existent PNC should include schedules consistent with the current superframe. Accordingly, if any DEV for whatever reason fails to receive a beacon of the current superframe, schedules of previously received beacons in previously received superframes can be relied on. This situation can occur, if for example, the originally designated PNC suddenly disappears. The 1st PNC successor then takes over the piconet 110. For whatever reasons, the 1st PNC successor which intends to transmit a beacon in the nth superframe is also suddenly unavailable. The 2nd PNC successor begins to take over the piconet 110, at the (n+1)th superframe. All DEVs can rely on the information of the (n−1)th beacon of the (n−1)th superframe to continue with the network operation, thereby curtailing incidents of disruption.

Figure 3:
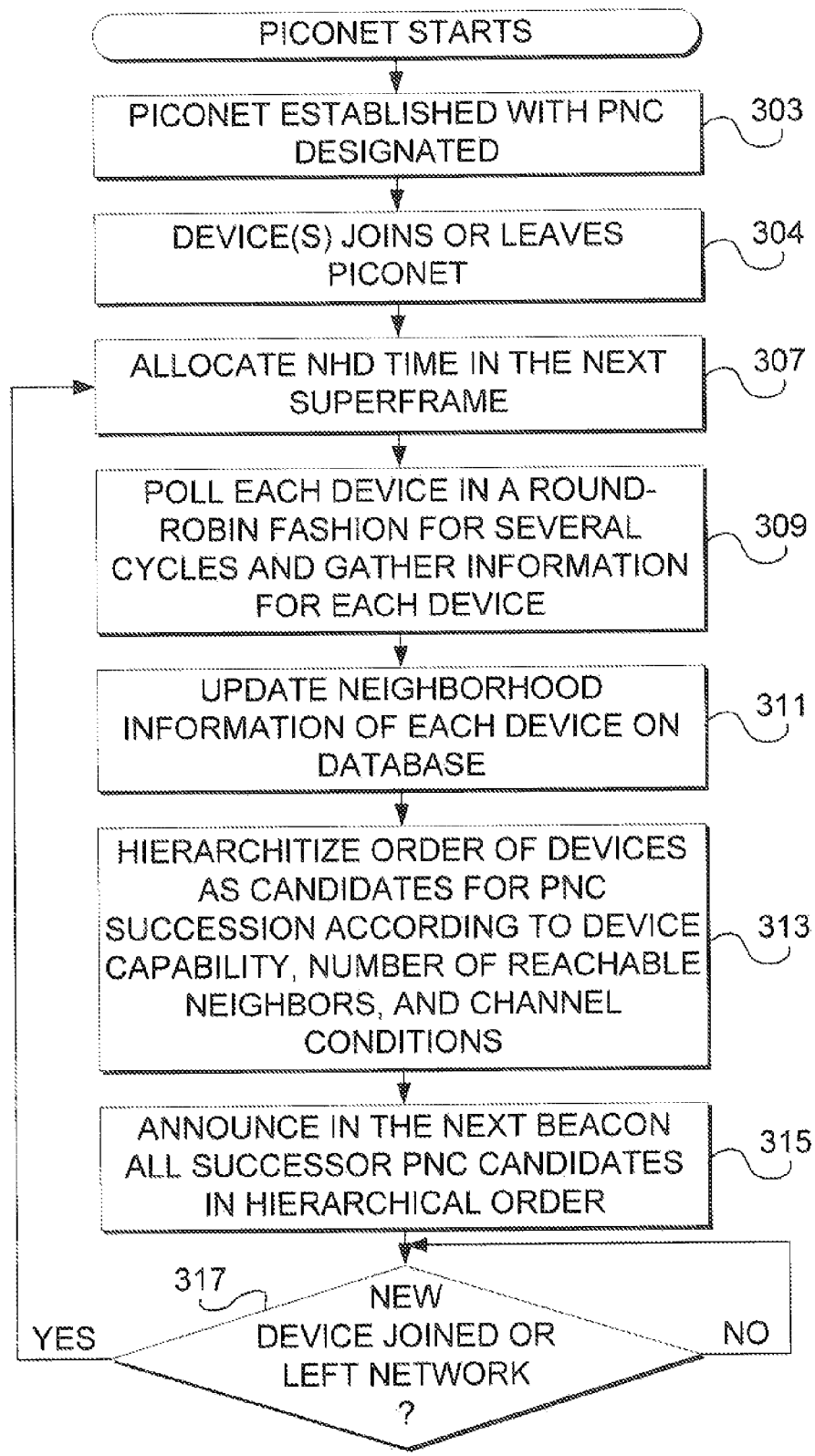
FIG. 3 is a flow diagram showing the steps involved in accordance with an exemplary embodiment of the invention.

FIG. 3 is a flow diagram showing the steps involved in the process. When the piconet is established (step 303), a PNC is designated by the DEV starting the piconet. Successive DEVs join or leave the piconet (step 304) and the PNC allocates NHD time in the next superframe (step 307). Each DEV is polled in a round-robin fashion by the PNC (step 309), which enables the PNC to gather information for each DEV. The neighborhood, information for each DEV is updated on a database held by the PNC (step 311). The PNC then establishes a hierarchy of an order of DEVs as candidates for PNC succession according to device capability, number of reachable neighbors and channel conditions (step 313). In the next beacon or in a successive beacon, all successor PNC candidates are provided in a hierarchal order (step 315).

The hierarchal order is established by the number of missed beacons detected by the DEV before that DEV assumes the PNC function as a successor PNC. Thus, if a particular DEV is assigned a hierarchy which dictates that the DEV assumes a PNC function after a DEV with a higher hierarchy, the DEV must wait at least one more missed beacon than the DEV with the higher hierarchy before assuming the PNC function. In that manner, if the DEV with the higher hierarchy assumes the PNC function, then consequently the number of missed beacons for DEV with a lower hierarchy is never reached.

It may be advantageous to skip beacons between assignments of DEVs in the hierarchy. This would allow a DEV with a higher hierarchy a number of beacons equal to the number of skipped beacons to acquire the PNC function before the next DEV attempts to acquire the PNC function.

After the assignment of successive PNC candidates are provided (step 315), a determination (step 317) is made as to whether a DEV has left the network or a new DEV has joined the network. If no DEV has joined or left the network, successive determinations are made. If a DEV has left the network or a new DEV has joined the network, the process is looped by returning to allocating NHD time in the next superframe (step 307). The process is also periodically looped by repeating the allocation of NHD time in the next superframe (step 307), or by returning the polling each DEV in a round-robin fashion by the PNC (step 309).

Figure 4:
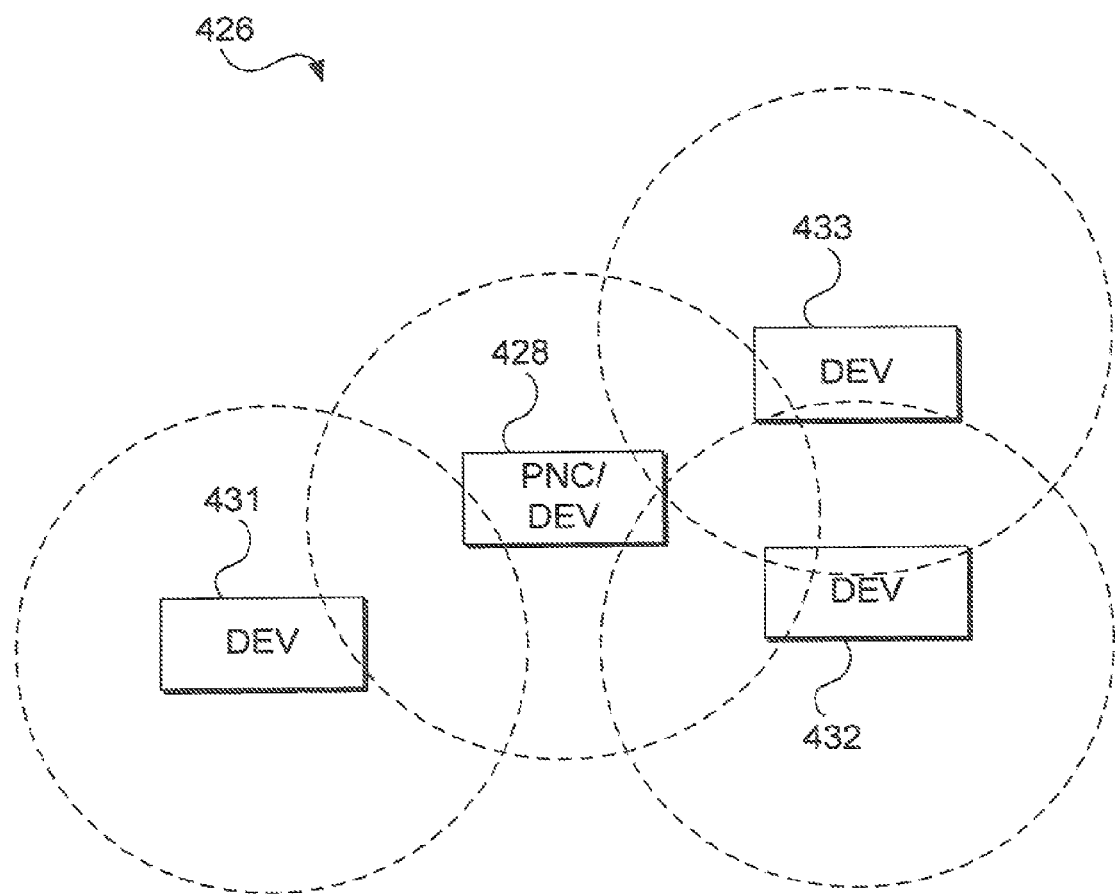
FIG. 4 is a schematic drawing of the WPAN operating in accordance with the MAC protocol in determining the PNC succession scheme.

FIG. 4 illustrates an exemplary succession scheme operated in according with the MAC (Media Access Control) protocol under IEEE 802.15.3. In this example, a particular factor, the factor of relative physical location, is highlighted as the key criterion for the succession scheme. The piconet in FIG. 4 is denoted by the reference numeral 426. Suppose, initially, DEV 428 is designated as the PNC. PNC 428 thereafter coordinates communications among three other DEVs 431, 432, 433.

In FIG. 4, each circle illustrated in dashed line surrounding each of DEVs 428 and 431, 432, 433 represents the extent of communication range.

To begin with, the current PNC/DEV 428 uses the NHD time (FIG. 2) to poll DEVs 431, 432 in according with the ascending order of MAC addresses. In the first round/cycle of the poll, it is possible that the devices that have been polled earlier have no knowledge of other devices that are associated and still available in the piconet 426.

Suppose initially, there are only two DEVs 431 and 432 associating with the PNC/DEV 428. Further suppose that DEV 431 and DEV 432 are not reachable with each other. DEV 433 then later joins the piconet 426. In the first round of polling, PNC 428 polls DEV 431. DEV 431 responds back that it is not aware of DEV 433 which has just joined the piconet 426. That is, DEV 431 indicates that it has no reachable neighbors to PNC 428 in response to the first poll message. Then PNC 428 polls DEV 432. Because DEV 433 is relatively proximal to DEV 432 in physical location, DEV 432 reports back to PNC 428 that there is a reachable neighbor, DEV 433, in its vicinity. Likewise, when PNC 428 polls DEV 433, DEV 433 informs PNC 428 that there is a reachable neighbor DEV 432 nearby.

After the first round of polling, PNC 428 gathers and digests all the received information. Then the digested information is sent to all DEVs 431-433 in the beacons of the next superframes (FIG. 2). Afterward, PNC 428 proceeds with the second round/cycle of polling. This time, all DEVs 431-433 should be aware of each other. As a consequence, each of DEVs 431-433 creates a neighborhood map along with the associated RSSI (Received Signal Strength Indication) value of each of its neighbors. In this round, DEV 431 is aware of the presence of DEV 433. Thus, in the second round of polling, DEV 431 responds back to PNC 428 that DEVs 432 and 433 are its neighbors. In a similar fashion, DEV 433 when polled in the second round, responds back to PNC 428 that DEVs 431 and 432 are its neighbors. Similarly, DEV 432 when polled reports back to PNC 428 and DEV 431 that DEV 433 are its neighbor.

PNC 428 then updates its own database and then determines the PNC successor list, according to predetermined criteria as aforementioned. In the next superframe. PNC 428 may append the information of the successor list in the beacon to all DEVs 431-433.

In this example, PNC 428 concludes that DEV 432 is the 1st PNC successor PNC, and thereafter randomly chooses DEV 431 or DEV 433 as the 2nd PNC successor. In addition, PNC 428 announces the schedules of all QoS (Quality of Service) flows/streams. The purpose to allow the PNC successors to smoothly carry out the transitions in the event that a PNC succession is needed.

Figure 5:
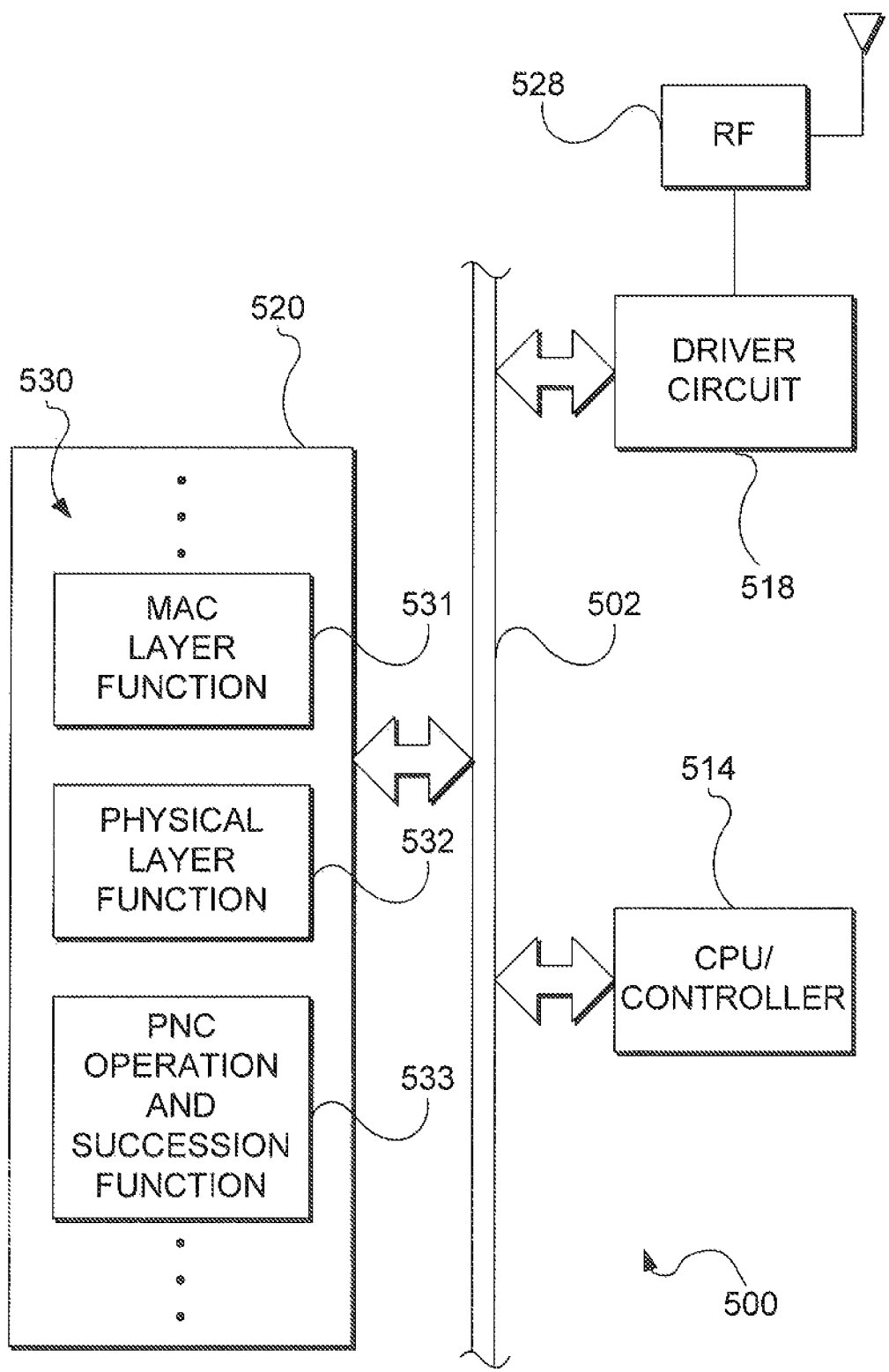
FIG. 5 is a general schematic drawing showing the hardware implementation in accordance with the exemplary embodiment of the invention.

FIG. 5 schematically shows the part of the hardware implementation of an apparatus 500, such as DEVs 112, 114, 116, 118 and 129 shown in FIG. 1, and DEVs 428 and 431-433 shown in FIG. 4.

The apparatus 500 comprises a central data bus 502 linking several circuits together. The circuits include a CPU (Central Processing Unit) or a controller 514, a driver circuit 518, and a memory unit 520.

If the apparatus 500 is part of a wireless device, the driver circuit 518 can be connected to a radio frequency (RF) circuit 528. The driver circuit 518 processes and buffers the data from the data bus 502 before sending out of the device 500, and for processing and buffering received signals before sending to the data bus 502. The CPU/controller 514 performs the function of data management of the data bus 502 and further the function of general data processing, including executing the instructional contents of the memory unit 520.

Instead of separately disposed as shown in FIG. 5, as an alternative, the driver circuit 518 can be a part of the CPU/controller 514. Some or all of the components of the apparatus can be provided as a chipset comprising one or more monolithic integrated circuit chips (ICs).

The memory unit 520 includes a set of instructions generally signified by the reference numeral 530. In this embodiment, the instructions include, among other things, a MAC layer function 531, a physical layer function 532, and a PNC operation and succession function 533.

The MAC layer function 531, the physical layer function 532, in conjunction with PNC operation and succession function 533 run the process as described above and shown in FIG. 3.

Instead of being implemented as computer-readable instructions in the memory unit 520, the MAC layer Function 531, the Physical Layer Function 532 and the PNC operation and succession function 533 can be implemented in hardware, for example, as circuitry included in the CPU/controller 514.

In the example configuration, the memory unit 520 is a random access memory (RAM) circuit. The functions 531, 532, 533 are software routines, modules and/or data sets. The memory unit 520 can be tied to another memory circuit (not shown) which can either be of the volatile or nonvolatile type.

As an alternative, the memory unit 520 can be made of other circuit types, such as electrically erasable programmable read only memory (EEPROM), electrical programmable read only memory (EPROM), read only memory (ROM), an application specific integrated circuit (ASIC), a magnetic disk, an optical disk, or other readable media.

It should be further be noted that the process as described and shown in FIG. 3 can also be coded as computer-readable instructions carried on any computer-readable medium known in the art. Here, the term "computer-readable medium" refers to any medium that participates in providing instructions to any processor, such as the CPU/controller 514 shown and described in FIG. 5, for execution. Such a medium can be of the storage type and may take the form of a volatile or non-volatile storage medium as also described previously, for example, in the description of the memory unit 520 in FIG. 5. Such a medium can also be of the transmission type and may include a coaxial cable, a copper wire, an optical cable, and the air interface carrying acoustic or electromagnetic waves capable of carrying signals readable by machines or computers.

While particular examples of configurations have been described, it will be understood by those skilled in the art that these and other changes in form and detail may be made therein without departing from the scope and spirit of the invention.

Functional Operation

Figure 6:
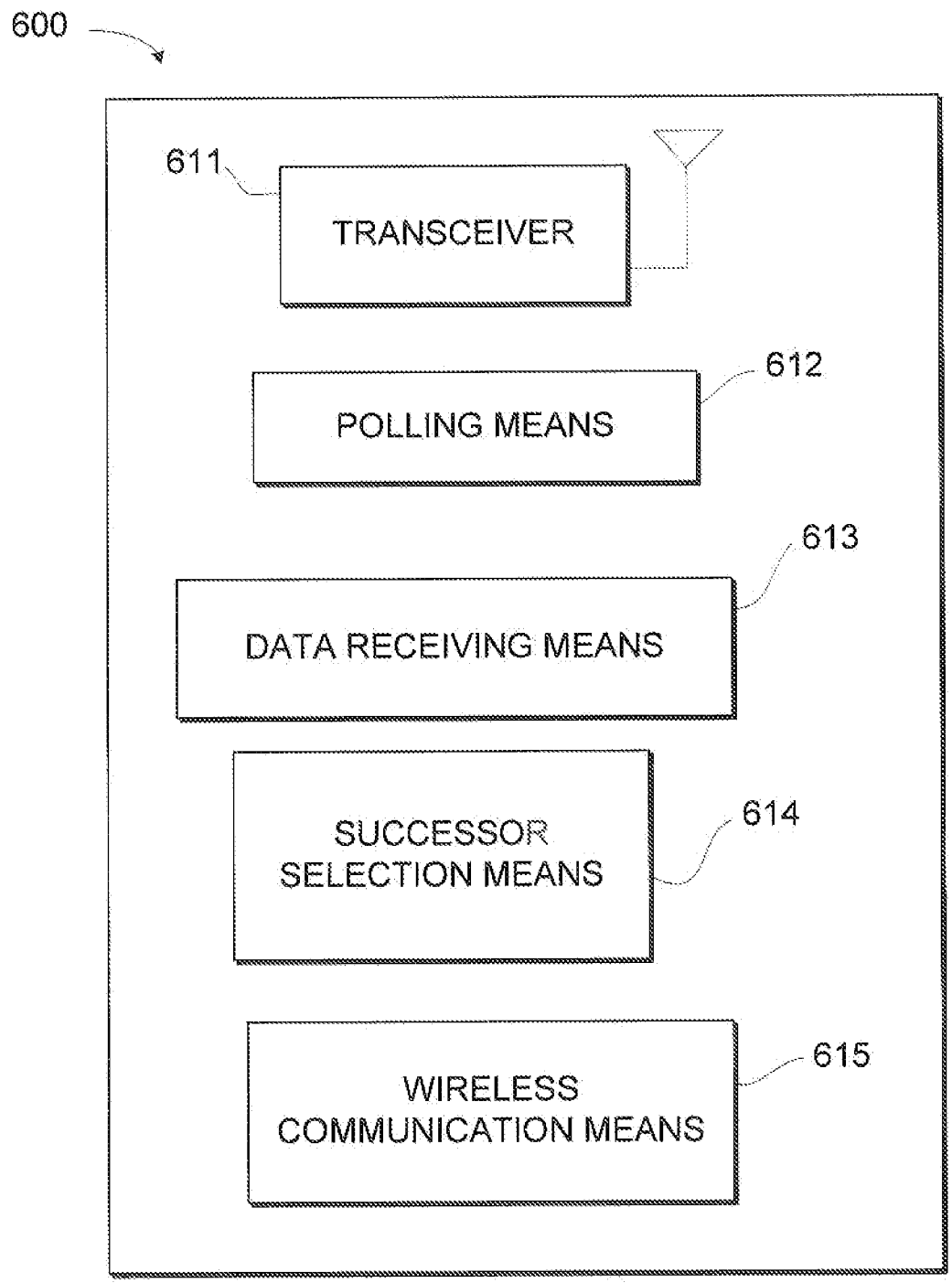
FIG. 6 is a block diagram showing the functional operation of a WCD capable of providing and assuming a control of a wireless network as a master communication station.

FIG. 6 is a block diagram showing the functional operation of a WCD 600 capable of providing and assuming a control of a wireless network as a master communication station. The WCD 600 includes a transceiver 611, polling means 612, data receiving means 613, means 614 for selection of at least one successor station, and wireless communication means 615.

The means 614 for successor selection provides selection of a hierarchy of successor stations. The polling means 612 may be a polling circuit module, for polling a plurality of stations to obtain data concerning stations in range of the respective polled stations. The data receiving means 613 receives data concerning stations in range of the respective polled stations. The wireless communication means 615 communicates the selection of the successor station to the successor station. The means 614 for selecting at least one successor station selects the successor station based on the received data concerning stations in range of the respective polled stations. In the event of a plurality of polled stations having a capability of becoming master communications, the means 614 for selecting selects the hierarchy of successor stations from said plurality, and the wireless communication means 615 communicates a successor protocol to stations in the hierarchy of successor stations following a selected first station in the hierarchy.

Figure 7:
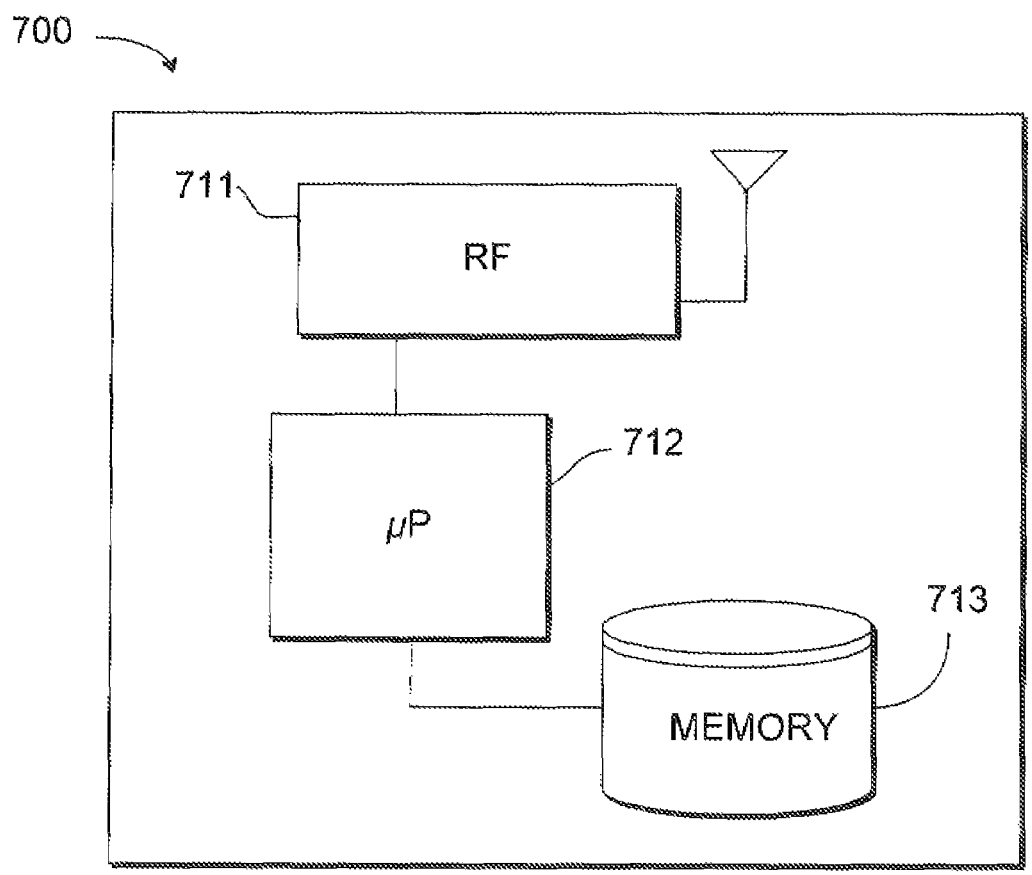
FIG. 7 is a diagram showing an arrangement of a circuit for performing the functions of providing continuity of communication.

FIG. 7 is a diagram showing an arrangement of a circuit 700 for performing the functions of providing continuity of communication. The circuit 700 includes an RF circuit 711, to provide an air interface, a processor 712, and a memory 713. The RF processor 712 provides the functions of converting data to and from a format for the RF interface, accepts channel assignments and assigns channel assignments in the case of the circuit 700 performing the PNC function. Additionally, the processor 712 performs the necessary polling functions and makes the determinations of successor status. including gathering information about DEVs and establishing a hierarchy of an order of DEVs as candidates for END succession. The processor 712 also makes the determinations of number of missing beacons for assuming the PNC function in accordance with the hierarchy. The memory 713 provides the processor 712 with a capability of performing processing steps and also provides storage for instructions for performing the processing steps. The circuit 700 can be provided as a chipset including one or more integrated circuit (IC) chips for performing the functions of the RE circuit 711, processor 712 and memory 713. The memory 713 may be integral with the chipset or may be provided as a separate machine readable medium.

CONCLUSION

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, microprocessor, or state machine. A processor may also be implemented as a combination of computing devices, e.g., a combination of a DSP and a microprocessor, a plurality of microprocessors, one or more microprocessors in conjunction with a DSP core, or any other such configuration. The methods or algorithms described in connection with the embodiments disclosed herein may be embodied directly in hardware, in a software module executed by a microprocessor, or in a combination of the two. A software module may reside in RAM memory, flash memory, ROM memory, EPROM memory, EEPROM memory, registers, hard disk, a removable disk, a CD-ROM, or any other form of storage medium known in the art. A storage medium may be coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

For a software implementation, the techniques described herein may be implemented with modules (e.g., procedures, functions, and so on) that perform the functions described herein. The software codes may be stored in memory units and executed by processors or demodulators. The memory unit may be implemented within the processor or external to the processor, in which case it can be communicatively coupled to the processor via various means.

The previous description of the disclosed embodiments is provided to enable a person skilled in the art to make or use the present invention. Various modifications to these embodiments will be readily apparent to those skilled in the art, and the generic principles defined herein may be applied as will be apparent to those skilled in the art. For example, one or more elements can be rearranged and/or combined, or additional elements may be added. Thus, the present invention is not intended to be limited to the embodiments shown herein but is to be accorded the widest scope consistent with the principles and novel features disclosed herein.

The invention claimed is:

1. In a wireless communication network comprising at least one master communication station and at least one slave communication station, in which at least one of the slave communication stations has a capability of functioning as a master communication station, a method for providing continuity of communications, comprising:

the at least one slave communication station listening to communications from other slave communication stations during a contention access period to obtain at least one signal strength information value;

during a neighborhood dissemination subframe in a contention access period, the at least one master station polling a plurality of stations to obtain data concerning stations in range of the respective polled stations;

receiving, by the at least one master station, data concerning the stations in range of the respective polled stations;

receiving, by the at least one master station, the signal strength information values for communications between potential successor stations while the successor stations were not operating in a master station capacity;

selecting, by the at least one master station, a hierarchy of successor stations based on the received data concerning the stations in range of the respective polled stations, the hierarchy based on the received signal strength information values for communications between successor stations while the successor stations were not operating in a master station capacity; and communicating, by the at least one master station, a successor protocol to stations in the hierarchy of successor stations during a beacon, the successor protocol comprising the hierarchy of the successor stations, wherein the at least one master communication station and the at least one slave communication station follow a communication format established by IEEE 802.15.

2. The method of claim 1, comprising providing the selection of hierarchy by providing the successor protocol according to a delay period such that acceptance by an earlier successor station preempts acceptance of a handoff of a master communication function by a next successor station.

3. The method of claim 1, comprising:
providing the selection of hierarchy by providing the successor protocol according to a delay period such that acceptance by an earlier successor station preempts acceptance of a handoff of a master communication function by a next successor station, the delay period corresponding to a superframe for communication with the network.

4. The method of claim 1, further comprising determining if a new station has joined the network or a previously detected station left the network, and in a case of an affirmative determination, repeating the selecting a hierarchy of successor stations and the communicating a successor protocol to stations in the hierarchy of successor stations.

5. The method of claim 1, wherein the successor protocol includes waiting for a time corresponding to a predetermined number of a predetermined sequence of communication timeframes before acceptance of a handoff of a master communication function by the first station in the hierarchy, and waiting for at least one additional predetermined sequence of communication timeframes before acceptance of a handoff of a master communication function by a next successor station.

6. The method of claim 1, wherein the polling a plurality of stations comprises a plurality of polling attempts.

7. The method of claim 1, wherein the at least one signal strength information value is further based on the at least one successor station listening to multiple contention access periods.

8. In a wireless communication network comprising at least one master communication station and at least one slave communication station, in which at least one of the master communication stations has a capability of functioning as a slave communication station, a method performed by the at least one slave communication station for providing continuity of communications, comprising:

listening to communications from other slave communication stations during a contention access period to obtain at least one signal strength information value;

receiving a poll request to obtain data concerning received communications during a neighborhood dissemination subframe in a contention access period;

transmitting data concerning stations in range, including data regarding an ability of the at least one slave communication station to communicate with other slave communication stations while the at least one slave communication station and other slave communication stations were not operating in a master station capacity;

transmitting the at least one signal strength information value for communications between slave communication stations while the slave communication stations were not operating in a master station capacity;

receiving data concerning a successor selection status;

monitoring beacons from a master communication station, in which the beacon comprises the successor selection status and a hierarchy of potential successor master stations; and in the event of termination of communication from the master communication station, determined based on monitoring of missed beacons, providing communication functions as a master communication station;

wherein the master communication station and the at least one slave communication station follow a communication format established by IEEE 802.15.

9. The method of claim 8, comprising:
providing communication functions as a master communication station in accordance with the hierarchy of potential successor master stations, whereby detection of a station providing master communication functions terminates further acceptance of the communication functions as a master communication station.

10. The method of claim 9, wherein a hierarchy protocol includes waiting for a time corresponding to a predetermined number of beacons for acceptance of a handoff of a master communication function by the first station in the hierarchy, and waiting for an additional time corresponding to the predetermined number of beacons for acceptance of a handoff of a master communication function by a next successor station.

* * * * *